May 29, 1934.  A. T. LARSON  1,960,912
PROCESS FOR THE PREPARATION OF HYDROGEN
Filed Oct. 21, 1930
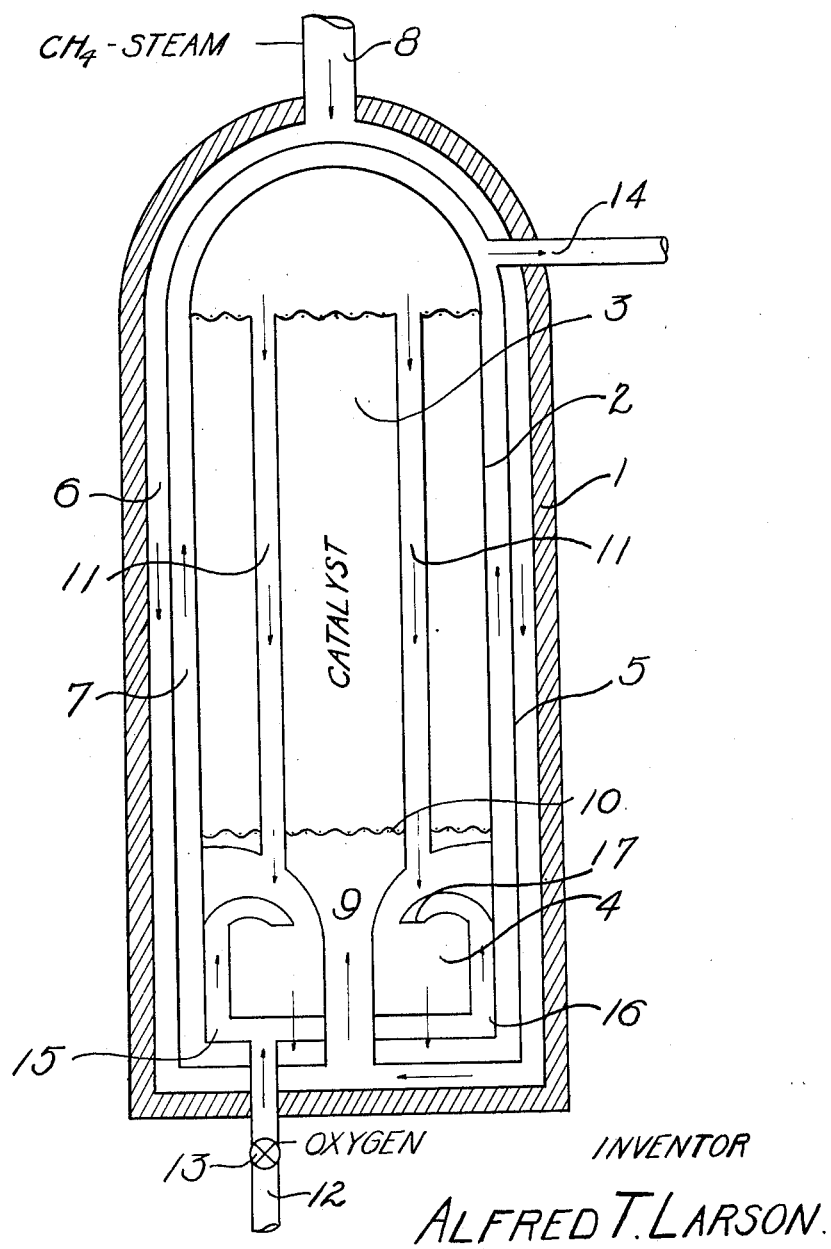
INVENTOR
ALFRED T. LARSON.
BY
ATTORNEY Patented May 29, 1934

1,960,912

UNITED STATES PATENT OFFICE 1,960,912

PROCESS FOR THE PREPARATION OF HYDROGEN

Alfred T. Larson, Wilmington, Del., assignor, by mesne assignments, to E. I. du Pont de Nemours & Company, Wilmington, Del., a corporation of Delaware Application October 21, 1930, Serial No. 490,177

7 Claims. (Cl. 23—212)

This invention relates to a process for the preparation of hydrogen by the interaction of a hydrocarbon and steam in the presence of a catalyst and particularly to a process and apparatus for supplying heat to the reaction.

It is well known that in the preparation of hydrogen from hydrocarbons and particularly from the hydrocarbons of the paraffin series, such as methane, ethane, propone, etc. by reacting therewith with steam in the presence or in some instances in the absence of a catalyst, that the chemical reactions effected when methane is the hydrocarbon may be designated by either or both of the following chemical formulæ:

(1) $CH_4 + H_2O = CO + 3H_2$ (2) $CH_4 + 2H_2O = CO_2 + 4H_2$

These reactions between methane and steam and like hydrocarbon-steam reactions are strongly endothermic. The reaction (2) formulated above results, for example, in a loss of 39.3 calories and it is therefore necessary, in order to maintain the temperature of this reaction at any desired value to supply a corresponding amount of heat thereto. Various methods have been proposed for supplying this heat, such for example as employing electrical heating means within the reaction chamber or again by the injection of air or other oxygen containing gas into the hydrocarbon and steam mixture prior to or during the conversion. In employing such processes for maintaining the temperature of this reaction, adequate means for control of the temperature must be provided in order that the temperature be kept well within the optimum temperature zone.

An object of the invention is to provide a process for the preparation of hydrogen by the interaction of a hydrocarbon and steam in the presence of a catalyst, and particularly to a process for maintaining the temperature of this reaction. A further object of this invention is to provide an apparatus in which such self-sustained hydrocarbon conversion reactions can take place.

Other objects and advantages of this invention will be understood by reference to the following specification and to the accompanying drawing in which the figure is a diagrammatical cross-sectional elevation of a combined catalytic and combustion chamber adapted for the practice of my invention.

Numerous investigators have studied this problem of stabilizing the temperature of the endothermic hydrocarbon-steam conversion reactions. The U. S. Patent No. 1,711,036 of John S. Beekley describes a process for maintaining the temperature of the reaction by passing oxygen into the converter with the hydrocarbon and steam and by thus burning some of the hydrocarbon the necessary heat is supplied to the reaction. In the Beekley process a reducing gas is also present to inhibit any possible loss in the activity of the catalyst. In U. S. Patent No. 1,736,065, Roger Williams, a process for sustaining the temperature of the reaction is disclosed in which oxygen is injected into the catalyst at various stages during the course of the reaction,—the heat evolved by the burned gases supplying the necessary heat to the reaction. While the above solutions of the problem have many economical and operative advantages, I have devised a process whereby the reaction is self-sustaining and with the further advantage that any suitable hydrocarbon-steam conversion catalyst may be utilized in my process as no oxidization difficulties, which in the Beekley and Williams patents are circumvented by various expedients, are encountered.

I have found that the temperature of the hydrocarbon-steam conversion reaction can be readily controlled and efficiently maintained at the optimum temperature for the catalysis by injecting oxygen into the gases from the conversion which invariably contain a low percentage of hydrocarbons. Thus the temperature of the gaseous mixture is increased due to the combustion of the hydrocarbon and/or carbon monoxide and by the exchange of heat from the combustion gases to the converter and/or to the untreated gases, the temperature of the reaction is maintained. I have likewise found that by varying the amount of oxygen injected into the products of the hydrocarbon conversion the temperature of the conversion can be controlled within definite limits.

In the practical application of my invention, any suitable type of converter may be employed but I have found that a converter, which contains both the catalytic reaction chamber and a chamber in which the combustion of the partially converted gases may take place, is particularly advantageous providing that there be present in this converter means for effecting efficient heat interchange between the gases from the combustion chamber and the catalytic reaction chamber. It is generally advisable also to preheat both the incoming hydrocarbon-containing gas prior to its admission to the catalytic chamber, as well as the oxygen-containing gas which is used for the combustion of the partially converted hydrocarbon. There are numerous types of apparatus in which such a reaction may take place but the following will serve to illustrate a preferred form of such an apparatus.

Referring now to the figure, 1 is a cylindrical casing in which there is concentrically mounted a cylindrical chamber 2, containing a catalyst compartment 3, and a combustion compartment 4 for the oxidation of the products of the hydrocarbon conversion. Outside the cylindrical chamber 2, there is centrally located between it and the outer casing 1, an intermediate cylinder 5, which forms a vapor space 6, between the outer casing 1, and the intermediate cylinder 5, and a second vapor space 7, between the intermediate cylinder 5, and the inner cylindrical chamber 2.

The hydrocarbon-containing gas after preheating to the desired degree in a suitable preheater, not shown, passes into the converter through the conduit 8; it is then conducted through the outer vapor space 6, to the bottom of the converter and then passes up through the central passage 9, which is located within the combustion chamber. The gas is then forced through the gas permeable partition 10 into intimate contact with the catalyst distributed in compartment 3. After at least partial conversion in compartment 3 it flows through the passages 11 into the combustion compartment 4. Here the unconverted hydrocarbon is burned with the oxygen which is forced into this compartment through conduit 12, the flow being controlled by valve 13. By controlling the quantity and temperature of the oxygen entering through pipe 12 a nice control of the temperature of the reaction may be effected. The post-heated gases then pass into the vapor space 7, and flow around the central cylindrical chamber 2 and, after giving up much of their sensible heat to the conversion chamber 3 and the incoming gases in the vapor space 6 with which they flow counter-current, they are discharged from the converter thru conduit 14. The oxygen-containing gas is likewise preheated as it flows from the conduit 12, through the passages 15 and 16, in heat exchange relation with the combustion chamber 4, and finally into the combustion chamber through a suitably shaped nozzle 17.

The heat of the catalyst chamber 3 may be further augmented by the admission of oxygen into the converted gases just as they issue from the catalyst chamber. The converted gases, thus heated by partial combustion, give up their excess heat to the catalyst bed as they pass downwardly thru the passages 11. The oxygen may be admitted into the chamber above the catalyst bed 3 by any suitable piping not shown.

An important feature of this apparatus is that in no instance is there intimate contact between the gases after combustion and the catalyst, the heat being transferred entirely by external heat exchange, i. e. the heated gases transfer their excess heat through an intermediate body, such as the walls of the catalyst chamber, to the gases being heated. While with the use of some catalysts the introduction of oxygen after at least a partial conversion of the hydrocarbon directly into the catalyst bed would not markedly lower the efficiency of the catalyst, when other catalysts are employed, however, which are partially inactivated by the presence of oxygen, its injection to increase the temperature of the endothermic reaction lowers the efficiency of the catalyst. As it is often highly desirable that catalysts of the latter type be employed, my apparatus and process make their use possible while insuring their high rate of catalytic activity over a long period.

While the process herein described may be varied thru wide limits, I am illustrating below one method of conducting the invention, and it will be understood that the type of conversion process described, together with the specific temperature, pressure, or other details therein given, will not restrict in any way the scope of the invention.

A catalyst may be prepared by crushing pumice stone to 8–14 mesh, leaching with boiling hydrochloric acid until free from iron and then with boiling distilled water until free from chlorides. After drying at 200° C., stir 100 parts at that temperature into a boiling solution of 50 parts of nickel nitrate and 2.6 parts of cerium nitrate, all of which should be free from sulphur, halogens and other contact poisons, in 70 parts of distilled water. After the absorption is complete remove the pumice from the solution and calcine it at 400° C. until the nitrogen oxides have been expelled, place in the catalyst compartment 3, and reduce with hydrogen at 400° C. The gaseous mixture which may consist, for example, of steam and methane, freed preferably from sulphur compounds and other catalyst poisons, is prepared in the proportion of 15 volumes of methane to 150 volumes of steam. This gaseous mixture is passed into the converter at such a temperature that after heat interchange with the gases which have undergone combustion its temperature is raised to approximately 550° C., at which temperature it enters the catalyst compartment 3, and is herein at least partially converted, leaving generally from 4 to 6% methane unconverted. This gas, after passing through the passage-ways 11, is intimately mixed with incoming oxygen in the combustion chamber 4, and its temperature raised to 600–700° C. This temperature, of course, will be determined by the efficiency of the heat exchange between this post-heated gas and the gases within the converter 3, for sufficient heat should be generated by combustion of the gases from the converter to compensate for the heat absorbed by the hydrocarbon-steam conversion. If desired, several of these converters may be placed in series, with only a fractional conversion of the hydrocarbon taking place in each converter. By such a method a somewhat better control of the reaction may be effected, but with a considerable increase in cost of equipment.

In conducting the conversion of the hydrocarbon by my process atmospheric pressure or elevated pressures may be employed. If the latter,— pressures ranging from 5–20 atmospheres result in many economic and operating advantages particularly when hydrogen is to be produced in large quantities.

If air be employed in place of pure oxygen for the combustion reaction, its oxygen content can be so regulated that the final products issuing from the converter will contain the correct proportions of hydrogen and nitrogen for use in ammonia synthesis. On the other hand, if a gas free from nitrogen or the other gaseous products entering with the oxidizing gas be desired, the latter should preferably be free therefrom prior to use.

Various changes may be made in the details of operation, as well as in the type of apparatus found most advantageous for this reaction, without in any way departing from this invention or sacrificing any of the advantages that may be derived therefrom.

I claim:

1. The process of preparing hydrogen from a hydrocarbon and steam, in the vapor phase, which comprises increasing the temperature of the gases after they have undergone at least partial conversion by adding an amount of oxygen thereto to produce on combustion sufficient heat to render the hydrocarbon-steam reaction substantially self-sustaining and supplying heat to the gases undergoing conversion by heat exchange thereof with the thus heated gases.

2. The process of preparing hydrogen from a hydrocarbon and steam, in the vapor phase, which comprises increasing the temperature of the gases after they have undergone at least partial conversion by adding an amount of oxygen thereto to produce on combustion sufficient heat to render the hydrocarbon-steam reaction substantially self-sustaining and supplying heat to the gases undergoing conversion and to the gases prior to conversion by heat exchange thereof with the thus heated gases.

3. The process of preparing hydrogen from a hydrocarbon and steam, in the vapor phase, which comprises increasing the temperature of the gases to approximately 600–700° C. after they have undergone at least partial conversion at a temperature of approximately 550° C. by adding oxygen thereto and supplying heat to the gases undergoing conversion by heat exchange thereof with the thus heated gases.

4. In a process of converting a hydrocarbon and steam to hydrogen the steps which comprise introducing oxygen into the converted gases, thereby increasing their temperature, and supplying heat to the gases under going conversion by heat exchange thereof with the thus heated gases, the oxygen being added in an amount such that the reaction is self-sustaining.

5. In a process of converting a hydrocarbon and steam to hydrogen the steps which comprise introducing oxygen into the converted gases, thereby increasing their temperature, and supplying heat to the gases undergoing conversion and to the gases prior thereto by heat exchange thereof with the thus heated gases, the oxygen being added in an amount such that the reaction is self-sustaining.

6. In a process of converting a hydrocarbon and steam to hydrogen the steps which comprise introducing oxygen into the converted gases immediately after conversion, thereby increasing their temperature, and supplying heat to the gases undergoing reaction by heat exchange thereof with the thus heated gases, again introducing oxygen into the gases after said heat exchange and again supplying heat to the gases undergoing conversion by heat exchange thereof with the thus heated gases, the oxygen being added in an amount such that the reaction is self-sustaining.

7. In a process of converting methane and steam to hydrogen the steps which comprise introducing oxygen into the converted gases, thereby increasing their temperature, and supplying heat to the gases undergoing conversion by heat exchange thereof with the thus heated gases, the oxygen being added in an amount such that the reaction is self-sustaining.

ALFRED T. LARSON.